(12) United States Patent
Ashrafi

(10) Patent No.: US 10,726,339 B2
(45) Date of Patent: Jul. 28, 2020

(54) SIMILARITY-BASED REASONING WITH ENSEMBLE MEMORY VOTING

(71) Applicant: Intel Corporation, Santa Clara, CA (US)

(72) Inventor: Ali Ashrafi, Chapel Hills, NC (US)

(73) Assignee: Intel Corporation, Santa Clara, CA (US)

(*) Notice: Subject to any disclaimer, the term of this patent is extended or adjusted under 35 U.S.C. 154(b) by 965 days.

(21) Appl. No.: 15/201,102

(22) Filed: Jul. 1, 2016

(65) Prior Publication Data

US 2018/0005119 A1 Jan. 4, 2018

(51) Int. Cl.
*G06N 5/02* (2006.01)
*G06N 20/00* (2019.01)

(52) U.S. Cl.
CPC .......... *G06N 5/022* (2013.01); *G06N 20/00* (2019.01)

(58) Field of Classification Search
CPC ...... G06N 5/022; G06N 20/00; H04N 19/105; H04N 19/107; H04N 19/119; H04N 19/176; H04N 19/50; H04N 19/70
See application file for complete search history.

(56) References Cited

U.S. PATENT DOCUMENTS

| 8,620,909 | B1 | 12/2013 | Rennison |
| 2002/0087567 | A1* | 7/2002 | Spiegler ................ G06F 16/284 |
| 2008/0109212 | A1 | 5/2008 | Witbrock et al. |
| 2011/0194780 | A1* | 8/2011 | Li ........................ G06K 9/4642 |
| | | | 382/218 |
| 2016/0042253 | A1 | 2/2016 | Sawhney et al. |

OTHER PUBLICATIONS

Ukil, "Application of Kolmogorov Complexity in Anomaly Detection", Nov. 3, 2010, 2010 16th Asia-Pacific Conference on Communications (APCC), pp. 141-146 (Year: 2010).*
"International Application Serial No. PCT/US2017/035444, International Search Report dated Sep. 6, 2017", 3 pgs.
"International Application Serial No. PCT/US2017/035444, Written Opinion dated Sep. 6, 2017", 6 pgs.

* cited by examiner

*Primary Examiner* — Robert A Cassity
*Assistant Examiner* — Brent Johnston Hoover
(74) *Attorney, Agent, or Firm* — Schwegman Lundberg & Woessner, P.A.

(57) ABSTRACT

Systems and methods for recognizing an analogous case from a knowledge base including a plurality of candidate cases are disclosed. The system may include a data receiver to receive a representation of a target case, and a microprocessor coupled to the data receiver to generate a plurality of target attributes from the representation of the target case. The microprocessor may query the knowledge base to recognize the analogous case similar to the target case in information content using the target attributes and a plurality of attribute memories each including first and second attributes and an inter-attribute contextual representation of interactions between the first and second attributes in a context of the plurality of candidate cases. The system may include an output circuit to output the recognized analogous case to a user or a process.

20 Claims, 6 Drawing Sheets

SIMILARITY-BASED REASONING WITH ENSEMBLE MEMORY VOTING

TECHNICAL FIELD

This document relates generally to knowledge management system, and more particularly, to systems, methods, and computer program products for query a knowledge base for analogy detection.

BACKGROUND

Knowledge base query is a process of recognizing from a knowledge base an analogous case that shares similar features to a target case, such as a given document, a person, an entity, or a computer file. The recognition of the analogous case may involve similarity detection that may include computing a similarity metric between the target case and a candidate case in the knowledge base and comparing the similarity metric to a threshold. The threshold may be determined based on the tradeoffs between hits, missed opportunities, false alarms and correct rejections. Other analogy detection may include hyperplane separation models that fit the data on one or another side of a separation plane or hyperplane in a multidimensional feature space. Analogy detection may also be used in analogy-based reasoning including hypothesis generation.

In analogy detection, the target case and the cases stored in the knowledge base may each be represented by a feature vector including a plurality of discrete features. Conventionally, these features are independent to each other, and characterize particular aspects of the target case or the stored case. The analogy detection may be performed by exhaustive search of all the independent features within all the stored cases in the knowledge base. Such a representation of a feature vector, however, may not adequately represent deeper information about interactions or dependencies among the features, such as within the context of the target case or a stored case. Additionally, due to the large feature space and case space in the knowledge base, the query process that relies on exhaustive search of all features among all stored cases may be less efficient, time-consuming, and computationally intensive. The present inventor has recognized that there remains a need for systems and methods for more efficient knowledge management.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Described herein are systems, methods, computer program products that query a knowledge base for an analogous case similar to a target case in information content. In an example, a system may generate from a target case a vector of target attributes. An associative query module in the system may query the knowledge base using a plurality of attribute memories associated with the individual target attributes. The attribute memories each may include first and second attributes and an inter-attribute contextual representation of interactions between the first and second attributes in the context of prior cases in the knowledge base. The associative query module may compute a universal cognitive distance from a set of relevant attribute memories, and recognize, among the prior cases in the knowledge base, the analogous case based on an ensemble voting across the relevant attribute memories for each prior case in the knowledge base.

Figure 1:
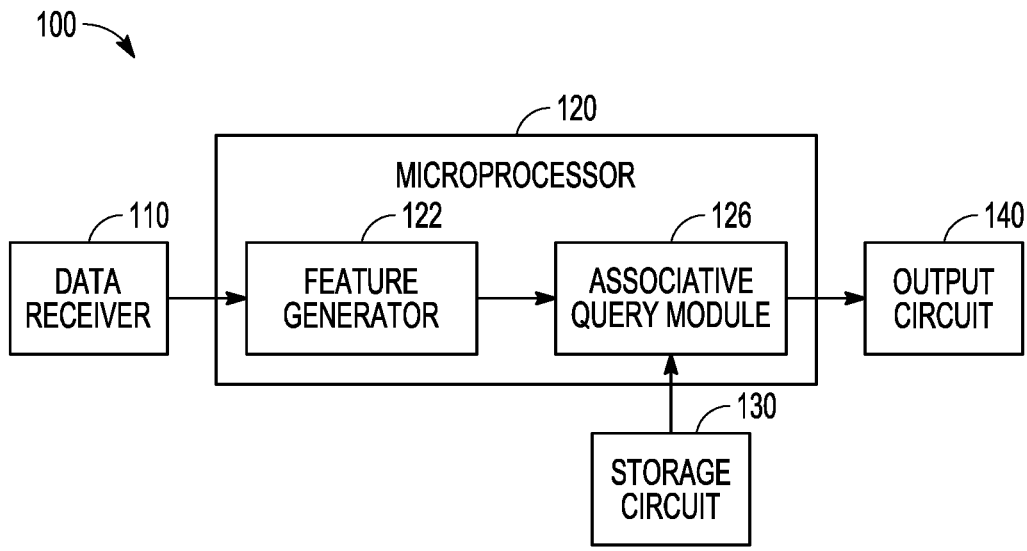
FIG. 1 illustrates, by way of example and not limitation, a diagram of a system for recognizing an analogous case from a knowledge base.

FIG. 1 illustrates, by way of example and not limitation, a diagram of a system 100 for recognizing an analogous case from a knowledge base. The knowledge base may include a plurality of candidate cases. A case, which may also be referred to as an entity, may include a person, a document, a graph, a device, a part, or a computer file, among others. The system 100 may include one or more of a data receiver 110, a microprocessor 120, a storage circuit 130, and an output circuit 140. In an example, the system 100 may include a computing device that may include one or more of the components 110-140. Examples of the computing device may include a computer or a portable device such as a handheld device. The components 110-140 may be distributedly implemented and communicatively inter-connected among a number of devices. In an example, the storage circuit 130 may be implemented in a remotely accessible device such as a data server.

One or more components of the system 100 may be implemented as a part of a microprocessor circuit. The microprocessor circuit may be a dedicated processor such as a digital signal processor, application specific integrated circuit (ASIC), microprocessor, or other type of processor for processing information. Alternatively, the microprocessor circuit may be a general purpose processor that may receive and execute a set of instructions of performing the functions, methods, or techniques described herein.

In some examples, one or more components of the system 100 may be implemented or executed in circuits or subcircuits. These circuits may, alone or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The data receiver 110 may receive a representation of a target case. The representation may be in a form of a computer-readable data file, such as a text or graph document. In an example, the data receiver 110 may be coupled to a user input device that enables or facilitates a user to receive and prepare the target case for query. Examples of the input device may include a keyboard, on-screen keyboard, mouse, trackball, touchpad, touch-screen, or other pointing or navigating devices.

The microprocessor 120 may include a feature generator 122 and an associative query module 126. The feature generator 122 may generate a plurality of target attributes from the target case representation. The target attributes may include descriptors characterizing the target case representation. In an example where the target case is a text document, the target attributes may include a plurality of words, terms, or phrases contained in the document. The target attributes may additionally or alternatively include information taken from metadata associated with the target case, such as source, time, creator, location, or size of the target case, among others. In some examples, the target attributes may include a level of generalization, computation, synthetization, or categorization of the target case such as performed at least in part by a user.

The associative query module 126 may be coupled to the feature generator 122 and the storage circuit 130, query the knowledge base retrievably stored in the storage circuit 130, and recognize at least one analogous case therein that is similar to the target case in information content. The storage circuit 130 may include a local memory circuit, or a remote device such as a remote data server that is accessible by the associative query module 126 via a communication network such as a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks).

The knowledge base in the storage circuit 130 may include a plurality of candidate cases of similar type to the target case. In an example, the candidate cases may include documents previously seen and analyzed by the microprocessor 120. The knowledge base may additionally include a plurality of attribute memories each including first and second attributes and an inter-attribute contextual representation of interactions between the first and second attributes in the candidate cases. The attribute memories may be organized as data structures such as multi-dimensional data arrays, and store information about presence and frequency of the pair of the first and second attributes co-existing in prior cases stored in the knowledge base. Examples of the attribute memories are discussed below, such as with reference to FIG. 2.

The associative query module 126 may query the target attributes such as generated by the feature generator 122 from the attribute memories. A subset of the attribute memories associated with the first and second attributes matching with the target attributes may be selected, and a universal cognitive distance may be calculated from the selected attribute memories. The universal cognitive distance may represent a quantitative vote that a particular attribute memory casts for a particular candidate case, and indicate the degree of similarity between the target case and the particular candidate case in the perspective of the particular attribute memory. The associative query module 126 may employ an ensemble voting scheme to compute aggregated distance across all the selected attribute memories for each of the candidate case, and recognize at least one analogous case based on the aggregated distance. Examples of the associative query of the knowledge base are discussed below, such as with reference to FIGS. 3-5.

The output circuit 140 may output the recognized analogous case to a user or a process. The output circuit 140 may include a display for presenting, in a human-perceptible medium format, the analogous case. The output circuit 140 may additionally or alternatively output ordered candidate cases sorted according to the aggregated distance. Other information, such as the aggregated distance of the recognized analogous case, the cognitive distances, or the relevant memories associated with the cognitive distances, may also be presented to a user or process. The information may be presented in a table, a chart, a diagram, or other textual, tabular, or graphical formats.

Figure 2:
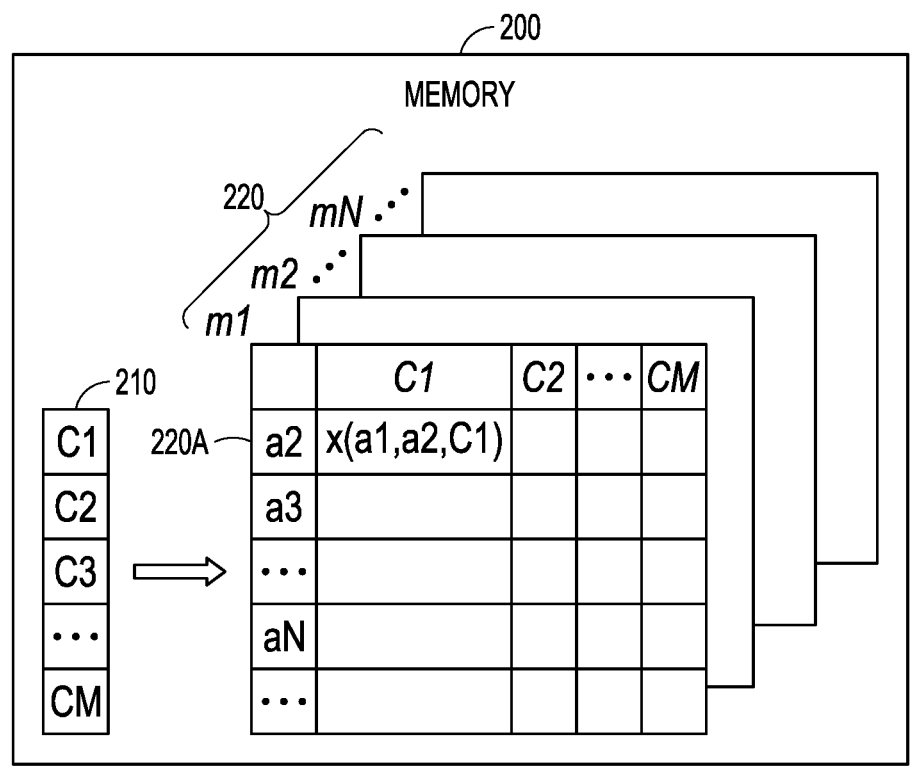
FIG. 2 illustrates, by way of example and not limitation, a diagram of a memory for use by a query system.

FIG. 2 illustrates, by way of example and not limitation, a diagram of a portion of a memory 200, which may be an embodiment of the storage circuit 130 in FIG. 1. The memory 200 stores knowledge base that may include a plurality of candidate cases (C) 210, such as C={C1, C2, ... , CM} where $C_j$ denotes a prior case seen and analyzed by the microprocessor 120, and stored in the knowledge base. Each case $C_j$ is a candidate that may be compared to the target case and may be selected as an analogous case if the ensembles of votes casted by the attribute memories for the case Cj satisfy a specified condition. The memory 200 additionally includes a plurality of attribute memories (m) 220, such as m={m1, m2, ... , mN, ... }. The attribute memories (m) represent knowledge acquired from prior cases, including the association between attributes taken from the prior cases, and their presence and frequency in the prior cases. Each attribute memory includes a first attribute (hereinafter identified as "observer" attribute) and a number of second attributes (hereinafter identified as "observed" attributes), where the first attribute defines the attribute memory. For example, the attribute memory 220A, denoted by m1, is defined by first attribute a1 and contains a number of second attributes {a2, a3, ... , aN, ... } observed by attribute a1. Similarly, the attribute memory m2 is defined by attribute a2, and the attribute memory mN is defined by attribute aN, etc.

The attribute memories may each be represented as a two-dimensional array indexed by the second attributes and the candidate cases. By way of example and not limitation, and as illustrated in FIG. 2, the attribute memories may each be represented as a matrix (hereinafter referred to as "attribute memory matrix") with the second attributes being row indices and the candidate cases being column indices. Within the memory location addressed by a particular second attribute and a particular candidate case may store an inter-attribute contextual representation that indicates co-existence of the first and second attributes in the corresponding candidate case. In an example, the inter-attribute contextual representation includes a frequency of observations of co-existence of the first and second attributes in the corresponding candidate case. For example, in attribute memory m1, the entry at the memory location defined by (a2, C1) is x(a1,a2,C1), a quantity of frequency of observations of co-existence of attribute tuple (a1, a2) within the candidate case C1. If the attribute tuple (a1, a2) has never been co-existed in the candidate case C1, then x(a1,a2,C1) is set to zero. The attribute memories (m) 220 thus organize and present the knowledge effectually in a three-dimensional structure that contains deeper information about the contextual representation of inter-attribute association among attributes {a1, a2, . . . , aN, . . . } across the prior cases {C1, C2, . . . , CM}.

In some examples, the attribute memories in the memory 200 may be updated using the results from the query for the analogous case. When a target case ($C_{TG}$) is analyzed, attributes of the target case and the inter-attribute contextual information as presented in the target case may be supplemented to the knowledge base. In an example, a new attribute memory associated with a target attribute of the target case, such as an attribute not previously present in the knowledge base, may be added to the knowledge base. In another example, an existing attribute memory (e.g., m1) may be augmented by including the target case ($C_{TG}$) (e.g., by adding a new column to the attribute memory matrix m1), or including one or more second attributes selected from the target attributes such as attributes not previously present in the knowledge base (e.g., by adding one or more new rows to the attribute memory matrix m1).

Figure 3:
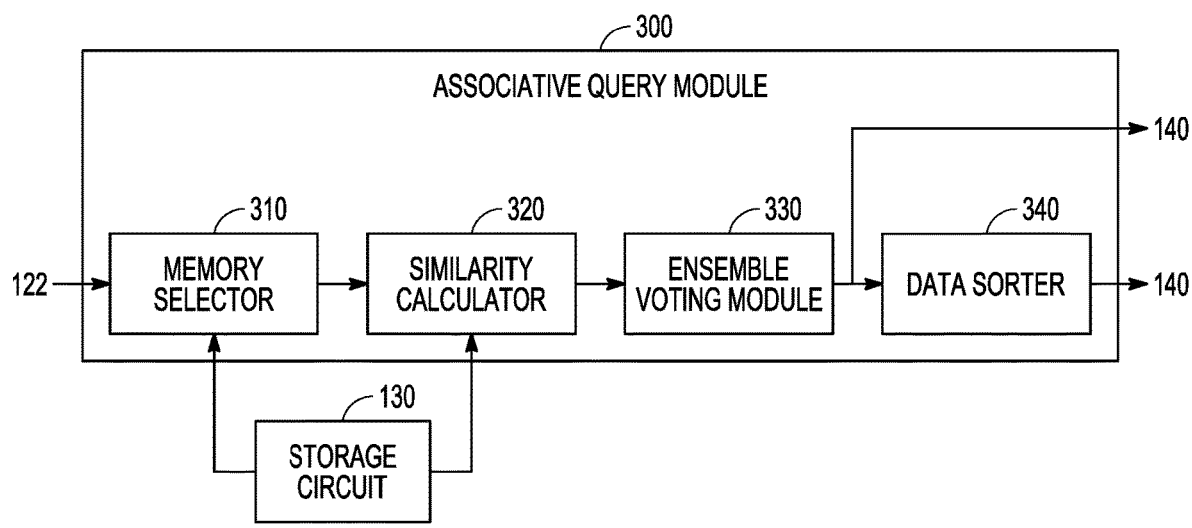
FIG. 3 illustrates, by way of example and not limitation, a diagram of an associative query module for querying a knowledge base.

FIG. 3 illustrates, by way of example and not limitation, a diagram of an associative query module 300, which may be an embodiment of the associative query module 126 in FIG. 1. The associative query module 300 may include a memory selector 310, a similarity calculator 320, an ensemble voting module 330, and a data sorter 340.

Figure 4:
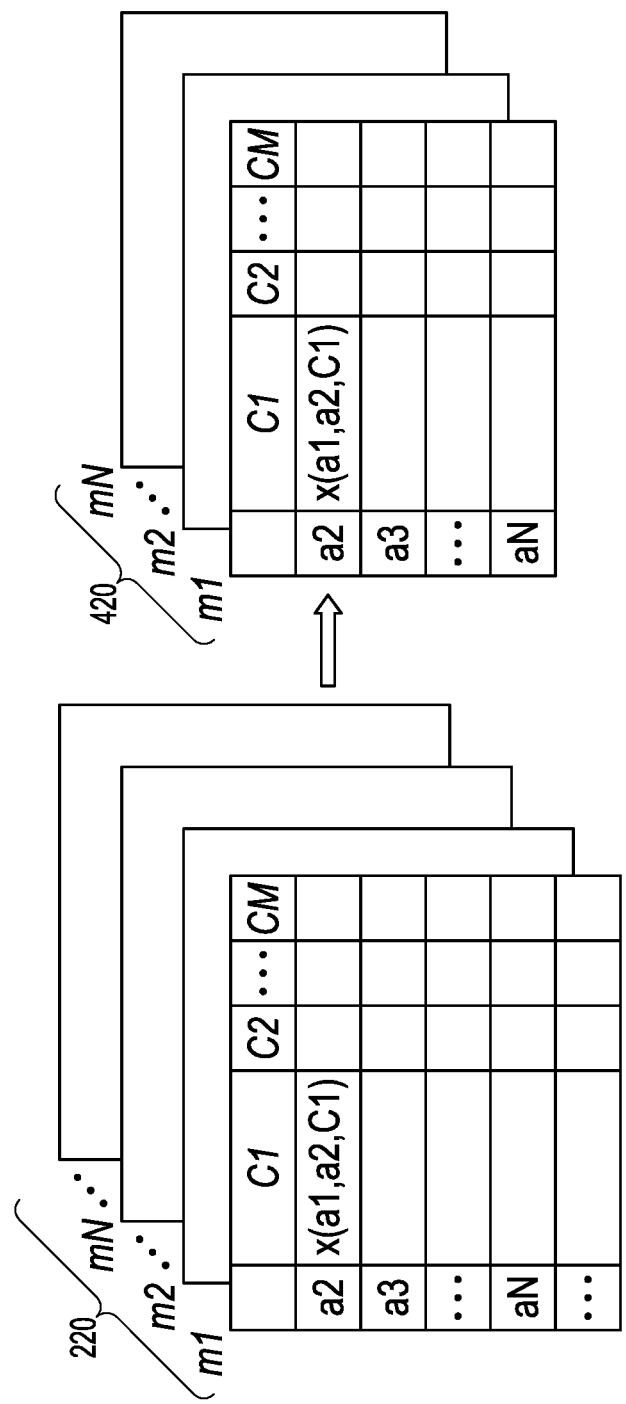
FIG. 4 illustrates, by way of example and not limitation, a diagram of attribute memories before and after memory selection.

The memory selector 310 may identify from the attribute memories m={m1, m2, . . . , mN, . . . } (such as stored in the storage circuit 130 as part of the knowledge base) a subset of relevant memories associated with the target attributes generated from the target case. The relevant memories each has a first attribute being one of the target attributes, and one or more second attributes selected from the target attributes different from the first attribute. In an example, an entirety of the target attributes different from the first attribute may be included in each of the relevant memories as the second attributes. By way of example and not limitation, FIG. 4 illustrates a diagram of attribute memories before and after memory selection such as via the memory selector 310. In this example, the target attributes generated from the target case $C_{TG}$ includes N attributes {a1, a2, . . . , aN}. Therefore, out of the attribute memories 220 m={m1, m2, . . . , mN, . . . }, a subset of memories 420 m'={m1, m2, . . . , mN} are selected, corresponding to the target attributes (a1, a2, . . . , aN), respectively. Within each selected attribute memory, only those second attributes appeared in the target attributes are selected. For example, for the selected attribute memory matrix m1, only the rows of a2 through aN are selected, because a2 through aN are the attributes appeared in the target attribute list. The resulting subset of memories 420 are relevant memories to be used in query for the analogous case.

Refer now back to FIG. 3, where the relevant attribute memories generated by the memory selector 310 may then be used by the similarity calculator 320 to determine universal cognitive distances. For each of the relevant memories, a cognitive distance associated with a candidate case may be computed using the inter-attribute contextual representation in the context of the candidate case. For example, for relevant memory mi, a cognitive distance $d_{ij}$ may be computed for candidate case $C_j$, using the inter-attribute contextual representations {x(ai,a1,$C_j$), x(ai,a2,$C_j$), . . . , x(ai, a(i−1),$C_j$), x(ai, a(i+1),$C_j$), . . . , x(ai, aN, $C_j$)}, that is, the entries in column $C_j$ of the attribute memory matrix mi. The cognitive distance $d_{ij}$ represents a quantitative vote that the attribute memory mi casts for case $C_j$, indicating the degree of similarity between the target case $C_{TG}$ and the candidate case $C_j$ in the perspective of attribute memory matrix mi.

The cognitive distance is a measure of similarity between two individual objects such as two documents, graphs, or computer programs in terms of information content. In an example, the cognitive distance may include a Kolmogorov complexity measure. The Kolmogorov complexity K(x) of a string x is the length of a shortest binary program to compute x on a universal computer (such as a universal Turing machine). As such, K(x) represents the minimal amount of information (or shortest possible description in some descriptive language) required to generate x by any effective process, thus a distance metric made with K(x) or an approximation thereof is also known as a type of universal cognitive distance.

The similarity calculator 320 may calculate a plurality of cognitive distances {$d_{ij}$}, for i=1, 2, . . . . N, which represents all the relevant attribute memories m'={m1, m2, . . . , mN}, and for j=1, 2, . . . , M, which represents the entire candidate cases C=(C1, C2, . . . , CM}. The cognitive distances {$d_{ij}$} may be represented as an N-by-M matrix $D_{N \times M}$ indexed by N rows of relevant attributes memories and M columns of candidate cases. Because each distance represents a quantitative vote that a particular attribute memory casts for a particular case, the cognitive distance matrix $D_{N \times M}$ may also be referred to as a voting table.

The ensemble voting module 330 may recognize, from the relevant memories m'=(m1, m2, . . . , mN), the analogous case using the cognitive distances respectively computed for the plurality of candidate cases across the relevant memories, that is, the voting table $D_{N \times M}$. The ensemble voting module 330 may compute, for a candidate case, an aggregated distance using the cognitive distances across the relevant memories. For example, the relevant memories m'={m1, m2, . . . , mN} each casts a vote for candidate case $C_j$, where the votes are represented by the cognitive distances {($d_{1j}$, $d_{2j}$, . . . , $d_{Nj}$}. The ensemble voting module 330 may compute an aggregated distance (or aggregated vote) $D_j$ using a combination of {$d_{1j}$, $d_{2j}$, . . . , $d_{Nj}$}, that is:

$$D_j = f(d_{1j}, d_{2j}, \ldots, d_{Nj}) \quad (1)$$

where f is a linear or a nonlinear function. In an example, the aggregated distance $D_j$ may be computed as a sum of the cognitive distances across the N relevant memories:

$$D_j = \Sigma_{i=1}^{N} d_{ij} \quad (2a)$$

In another example, $D_j$ may be computed using a weighted combination of the cognitive distances across the relevant memories, where the cognitive distances are each weighted by a respective weight factor:

$$D_j = \sum_{i=1}^{N} w_{ij} * d_{ij} \quad (2b)$$

where $w_{1j}, w_{2j}, \ldots, w_{Nj}$ are weight factors.

The ensemble voting module 330 may optionally normalize the aggregated distance with respect to a normalization factor, such that the normalized aggregated distance bounded within a range, such as between 0 and 1. In an example, the aggregated distance $D_j$ may be normalized by a count of the plurality of the candidate cases (N):

$$D_j = \frac{1}{N} * \sum_{i=1}^{N} d_{ij} \quad (3a)$$

In another example, the aggregated distance Dj, if computed using a weighted combination of the cognitive distances across the relevant memories, may be normalized by a combination of the weight factors:

$$D_j = (\sum_{i=1} w_{ij} * d_{ij})/(\sum_{i=1}^{N} w_{ij})$$

The ensemble voting module 330 may recognize the analogous case that is similar to the target case $C_{TG}$ when the aggregated distances for the plurality of candidate cases satisfy a specified condition. In an example, the aggregated distances $\{D_1, D_2, \ldots, D_M\}$ corresponding to candidate cases $\{C1, C2, \ldots CM\}$ may be compared to a threshold or a specified range, and one or more candidate cases with the corresponding aggregated distances falling within a specified range or exceeding a specified threshold are recognized as the analogous case that are substantially similar to the target case $C_{TG}$. The recognized one or more analogous cases may be provided to a user or a process such as via the output circuit 140.

In another example, the aggregated distances $\{D_1, D_2, \ldots, D_M\}$ are compared to each other, and the candidate case with the largest aggregated distance may be recognized as the analogous case. In some examples, the data sorter 340 may sort at least some of the candidate cases according to a specified order of the aggregated distance, such as a descending order or an ascending order of the aggregated distance. The sorted candidate cases may be provided to a user or a process such as via the output circuit 140. Further selection of analogous case may be made by a user or another process out of the sorted candidate cases, optionally along with other information such as the aggregated distances corresponding to the sorted candidate cases.

Figure 5:
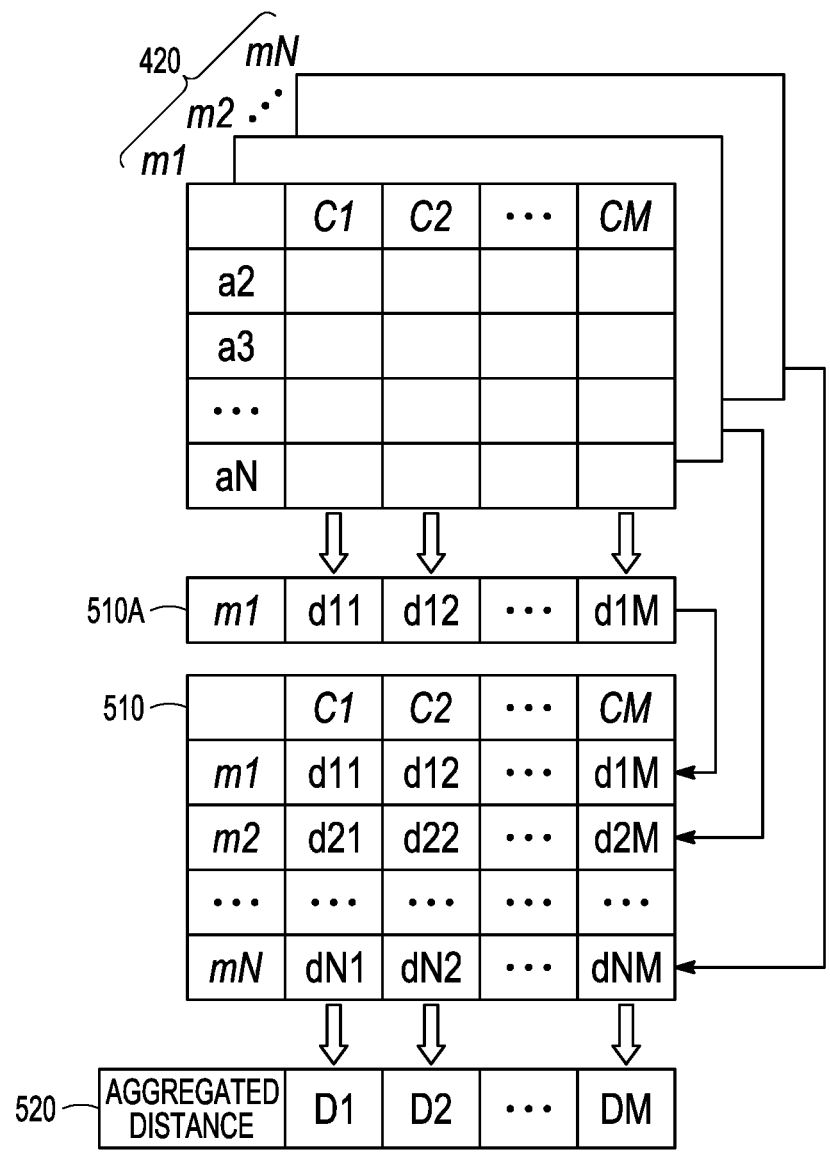
FIG. 5 illustrates, by way of example and not limitation, a diagram of data representations produced by an associative query module.

FIG. 5 illustrates, by way of example and not limitation, a diagram of data representations produced by various components of the associative query module 300. For each of the selected relevant attributed memories 420 such as relevant attribute memory m1, the similarity calculator 320 may calculate a cognitive distance, such as a Kolmogorov complexity measure, using the inter-attribute contextual representations of all the rows in each column of the relevant attribute memory m1. The resulting cognitive distance vector 510A, $[d_{11}, d_{12}, \ldots, d_{1M}]$, represents quantitative votes that memory m1 casts respectively for the candidate cases $\{C1, C2, \ldots, CM\}$. Cognitive distance vectors associated with the attribute memories m2, m3, . . . , mN may be similarly determined, and a voting table $D_{N \times M}$ 510 may be constructed where each row represents a cognitive distance vector, and each column represents the quantitative votes that a candidate case may receive from the relevant attribute memories $\{m1, m2, \ldots, mN\}$. The ensemble voting module 330 may determine from the voting table $D_{N \times M}$ 510 aggregated distances 520 for each candidate case, such as by using a linear or nonlinear combination of the cognitive distances (or quantitative votes that a candidate case may receive) from the relevant attribute memories $\{(m1, m2, \ldots, mN\}$.

By way of example and not limitation, the system 100 as illustrated in FIG. 1 or a modification thereof such as the associative query module 300 as illustrated in FIG. 3 may be used in a document retrieval system for querying a database of documents, such as previously seen and analyzed by the associative query module 300, for an analogous document that resembles the target document in information content. An example of such as document retrieval system may include a software bug tracking system that may recognize from a database of prior software bug reports a report including similar content as a target report presented by a customer. The feature generation module 122 may generate a plurality of target attributes including terms describing the issue of a software bug in the report such as "java", "remote", "local", "objects", etc. The memory selector 310 may select from a database of attribute memories, such as the attribute memories 220, a subset of relevant attribute memories 420 as illustrated in FIG. 4 based on the target terms. Each target term may be effectively represented by a relevant attribute memory, where for example as shown in FIG. 4, m1 is a "java" memory matrix, m2 is a "remote" memory matrix, and so on. The "java" memory matrix have rows of target terms other than "java", such as "remote", "local", or "objects", and columns of the prior reports $\{C1, C2, \ldots, CM\}$. Each report may be identified by a universally unique identifier (UUID). In an example, a prior report Cj may include several iterations or revisions of the same report.

The similarity calculator 320 may calculate cognitive distances for all relevant attribute memories, such as the cognitive distance vector 510A, represents quantitative votes for the candidate reports $\{C1, C2, \ldots, CM\}$ in the perspective of "java" memory. For example, the cognitive distance d12 represents the quantitative vote casted by "java" memory for report C2, as analogous to the target report in content, based on the contextual interaction between "java" and other target terms ("remote", "local", "objects", etc.) in the context of report C2. The ensemble voting module 330 may determine from the voting table 510 aggregated distances 520 for each report in the database. For example, the aggregated distance D1 represents aggregated votes for the report C1, as casted by all "java" memory, "remote" memory, and all other relevant attribute memories. At least one report may then be selected from $\{C1, C2, \ldots, CM\}$ as the analogous report that contains similar content to the target report, such as the report having a larger aggregated distance than other reports. The reports may be sorted such as in a descending order of aggregated distance and presented to the user, or provided to a process for additional processing.

Figure 6:
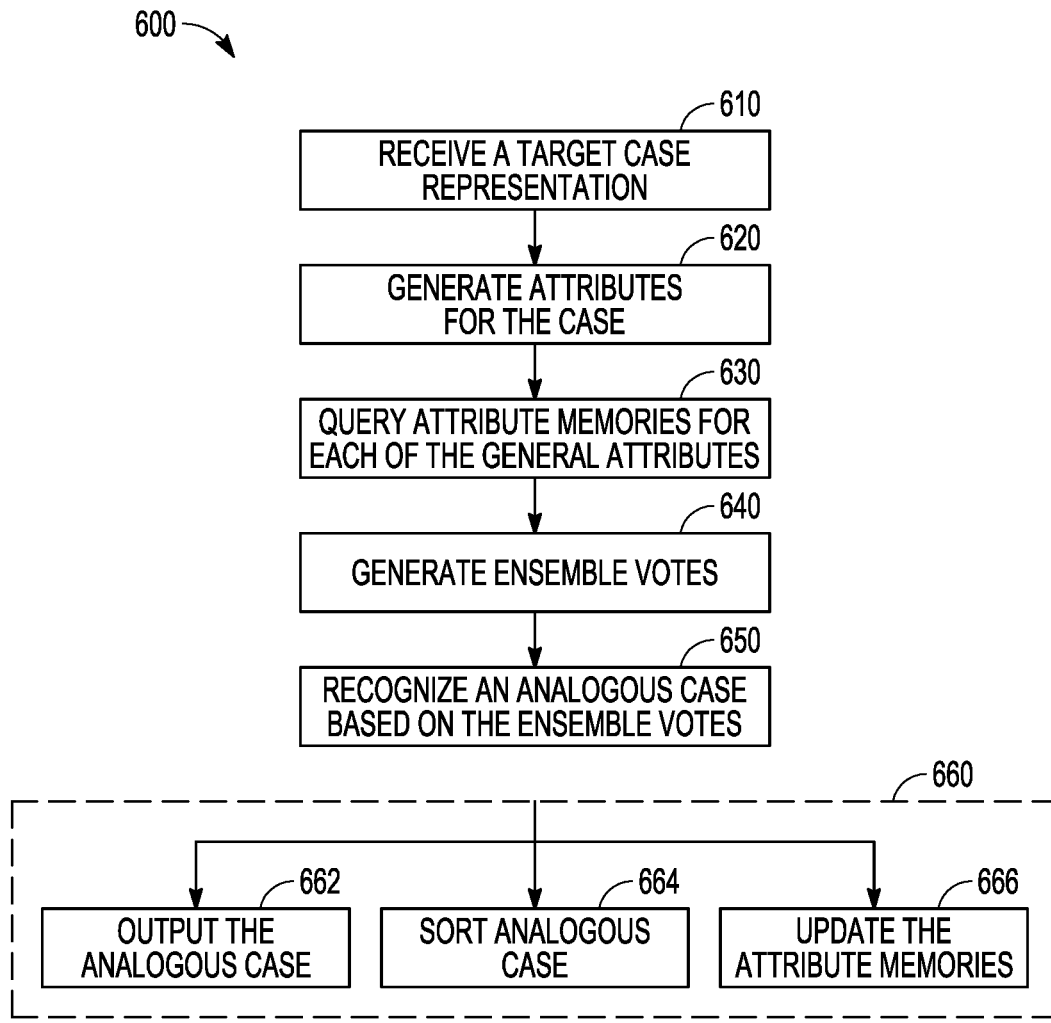
FIG. 6 illustrates, by way of example and not limitation, an example of a method for querying a knowledge base for an analogous case.

FIG. 6 illustrates, by way of example and not limitation, an example of a method 600 for recognizing an analogous case from a knowledge base. The method 600 may be implemented and executable in computing device such as a computer or a portable device, or distributedly implemented among a number of communicatively inter-connected devices. In an example, the method 600 may be implemented and executable in the system 100 or a modification thereof.

The method 600 begins at 610 with receiving a target case representation $C_{TG}$, such as from a user via one or more user input devices. The representation may be in a form of a computer-readable data file, such as a text or graph document. At 620, a plurality of target attributes may be generated from the target case representation, such as via the feature generator 122 in FIG. 1. The target attributes may include descriptors characterizing the target case representation. In an example of document retrieval where the target case includes a document or a report, the target attributes may include terms or phrases taken from or artificially generalized from a document. Target attributes may additionally or alternatively be extracted from metadata of the document.

At 630, a plurality of attribute memories may be analyzed for querying for an analogous case that resembles the target case representation. The plurality of attribute memories may be a part of a knowledge base such as stored in the storage circuit 130, which can be accessed locally or remotely such as via a telecommunication network. The attribute memories may have data structures such as multi-dimensional data arrays as illustrated FIG. 2. Each attribute memory may include first and second attributes and an inter-attribute contextual representation of interactions between the first and second attributes in each of a plurality of candidate cases which may also be stored in the knowledge base. The first attribute, also referred to as an "observer" attribute, defines the attribute memory. The second attributes, also referred to as "observed" attributes, are different from the first attribute. The inter-attribute contextual representation may include information such as presence and frequency of the first and second attributes co-existing in prior cases.

Also at 630, a subset of relevant memories associated with the target attributes may be selected from the attribute memories, such as via the memory selector 310. The relevant memories each has a first attribute being one of the target attributes, and one or more second attributes selected from the target attributes different from the first attribute. By way of example of not limitation, and as illustrated in FIG. 4, with each of a subset of the attribute memories corresponding to the target attributes, only those second attributes appeared in the target attributes are selected. The selected relevant attribute memories, such as the memories 420 in FIG. 4, may then be used to determine universal cognitive distances, such as via the similarity calculator 320. The cognitive distance is a measure of similarity between two individual objects such as two documents, graphs, or computer programs in terms of information content. An example of the universal cognitive distance may include a Kolmogorov complexity measure. The cognitive distance may be computed using the inter-attribute contextual representation in the context of the candidate case. For example, cognitive distance dij for relevant memory mi and candidate case $C_j$ may be computed using a Kolmogorov complexity measure based on the inter-attribute contextual representations {x(ai, a1, $C_j$), x(ai, a2, $C_j$), . . . , x(ai, a(i−1), $C_j$), x(ai, a(i+1), $C_j$), . . . , x(ai, aN, $C_j$)}. The cognitive distance $d_{ij}$ represents a quantitative vote that the attribute memory mi casts for case $C_j$, indicating the degree of similarity between the target case $C_{TG}$ and the candidate case $C_j$ in the perspective of attribute memory mi. If the attribute memory mi has no vote for case $C_j$, then $d_{ij}$ is effectively zero. The cognitive distances computed for all the candidate cases and across all the relevant attribute memories may be represented as a voting table, or an N-by-M voting matrix $D_{N \times M}$ indexed by N rows of relevant attributes memories and M columns of candidate cases, such as illustrated in FIG. 5.

At 640, ensemble votes may be generated, such as via the ensemble voting module 330. For a candidate case, the cognitive distances across the relevant memories may be aggregated such as by using a linear or nonlinear function, as indicated by the formula given in Equations (1), (2a) or (2b). The aggregation may take the form of a sum of the cognitive distances across the N relevant memories, or a weighted combination of the cognitive distances across the relevant memories, where the cognitive distances are each weighted by a respective weight factor. In some examples, the aggregated distance may be normalized the with respect to a normalization factor, such as according to Equations (3a) or (3b), such that the normalized aggregated distance bounded within a range such as between 0 and 1.

At 650, at least one analogous case may be recognized among the candidate cases (C1, C2, . . . , CM) when the aggregated distances satisfy a specified condition. In an example, a candidate case with the corresponding aggregated distances falling within a specified range or exceeding a specified threshold may be recognized as the analogous case. In another example, a candidate case with the largest aggregated distance may be recognized as the analogous case.

At 660, the recognized analogous cases, optionally along with the aggregated distances, the cognitive distances and the voting table or other immediate results generated at blocks 620 through 650, may be used in different ways or in different processes. For example, at 662, the recognized one or more analogous cases may be provided to a user or a process such as via the output circuit 140. Other information, such as the aggregated distance of the recognized analogous case, the cognitive distances, or the relevant memories associated with the cognitive distances, may also be presented to a user or process, such as presented in a table, a chart, a diagram, or other textual, tabular, or graphical formats. At 664, the candidate cases may be sorted according to a specified order of the aggregated distance, such as a descending order or an ascending order of the aggregated distance. The sorted candidate cases may be provided to a user or a process such as via the output circuit 140, and further selection of analogous case may be made by a user or another process out of the sorted candidate cases, optionally along with other information such as the aggregated distances corresponding to the sorted candidate cases. Additionally or alternatively at 666, the attribute memories may be updated by using the results from the query for the analogous case. For example, after a target case ($C_{TG}$) has been analyzed, the target attributes and the inter-attribute contextual information as presented in the target case may be supplemented to the knowledge base. A new attribute memory associated with a target attribute of the target case, such as an attribute not previously present in the knowledge base, may be added to the knowledge base. An existing attribute memory previously stored in the knowledge base may be augmented by including the target case ($C_{TG}$), or including one or more second attributes selected from the target attributes, such as attributes not previously present in the knowledge base.

Figure 7:
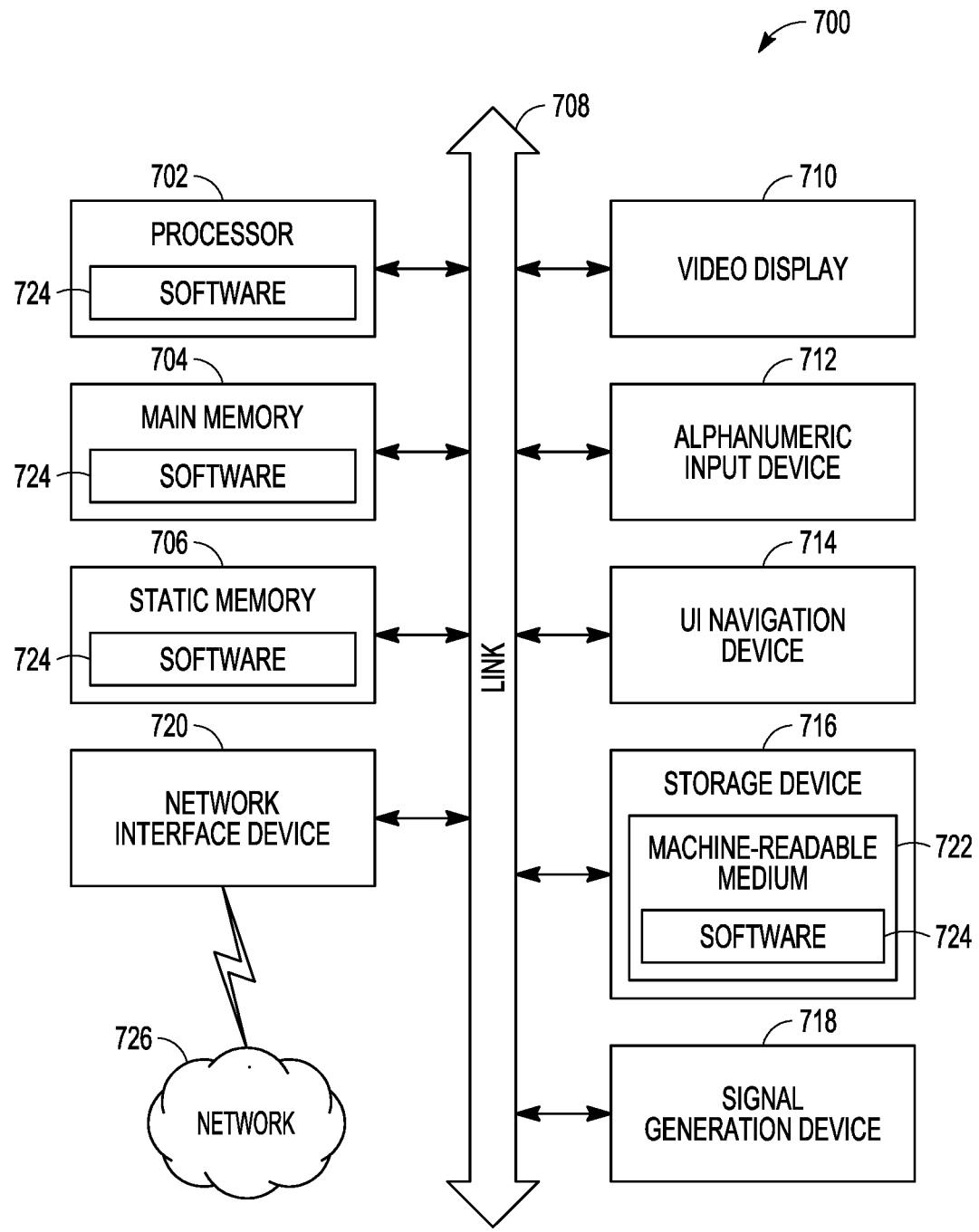
FIG. 7 illustrates, by way of example of not limitation, a block diagram illustrating an example machine upon which any one or more of the techniques discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown).

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media. In an example, the instructions 724 stored in the machine-readable storage medium 722 include instructions causing the computer system 700 to receive a representation of a target case, generate a plurality of target attributes from the target case representation, query a knowledge base that may include a plurality of candidate cases to recognize one or more analogous cases similar to the target case in information content, and present the recognized analogous case to a user or a process. The instructions 724 may further include instructions causing computer system 700 to identify from the plurality of attribute memories a subset of relevant memories associated with the target attributes, compute a cognitive distance associated with a candidate case using the inter-attribute contextual representation in the context of the candidate case, generate an aggregated distance for a candidate case using the cognitive distances across the relevant memories, or sort at least some of the candidate cases according to a specified order of the aggregated distance.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

In this document, embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Additional Notes & Examples

Example 1 is a system for recognizing an analogous case from a knowledge base including a plurality of candidate cases. The system may comprise: a data receiver to receive a representation of a target case; a microprocessor coupled to the data receiver to generate a plurality of target attributes from the representation of the target case, and to query the knowledge base to recognize the analogous case similar to the target case in information content using (1) the target attributes and (2) a plurality of attribute memories each including first and second attributes and an inter-attribute contextual representation of interactions between the first and second attributes in a context of the plurality of candidate cases; and an output circuit to output the recognized analogous case to a user or a process.

In Example 2, the subject matter of Example 1 optionally includes the inter-attribute contextual representation that may include an indicator of co-existence of the first and second attributes in a candidate case.

In Example 3, the subject matter of Example 2 optionally includes the indicator of co-existence that may include a frequency of observations of co-existence of the first and second attributes in a candidate case.

In Example 4, the subject matter of any one or more of Examples 1-3 optionally include a storage circuit coupled to the microprocessor, wherein the storage circuit may store the plurality of attribute memories.

In Example 5, the subject matter of Example 4 optionally includes the attribute memories each of which is represented in the storage circuit as a two-dimensional array indexed by the second attributes and the plurality of candidate cases.

In Example 6, the subject matter of any one or more of Examples 1-5 optionally include the microprocessor to query the knowledge base, including: identify from the plurality of attribute memories a subset of relevant memories associated with the target attributes, the relevant memories each having a first attribute being one of the target attributes, and one or more second attributes selected from the target attributes different from the first attribute; and query the relevant memories to recognize the analogous case.

In Example 7, the subject matter of Example 6 optionally includes the relevant memories each of which has the second attributes including an entirety of the target attributes different from the first attribute.

In Example 8, the subject matter of any one or more of Examples 6-7 optionally include the microprocessor that may recognize the analogous case, including: for each of the relevant memories, compute a cognitive distance associated with a candidate case using the inter-attribute contextual representation in the context of the candidate case; and recognize from the relevant memories the analogous case based on the cognitive distances respectively computed for the plurality of candidate cases across the relevant memories.

In Example 9, the subject matter of Example 8 optionally includes the cognitive distance that may include a Kolmogorov complexity measure.

In Example 10, the subject matter of any one or more of Examples 8-9 optionally include the microprocessor that may perform ensemble voting including generate, for a candidate case, an aggregated distance using the cognitive distances across the relevant memories, wherein the microprocessor may recognize the analogous case when the aggregated distances for the plurality of candidate cases satisfy a specified condition.

In Example 11, the subject matter of Example 10 optionally includes the microprocessor that may generate the aggregated distance using a linear or nonlinear combination of the cognitive distances across the relevant memories.

In Example 12, the subject matter of Example 11 optionally includes the microprocessor that may normalize the aggregated distance with respect to a count of the plurality of the candidate cases.

In Example 13, the subject matter of any one or more of Examples 10-12 optionally include the microprocessor that may generate the aggregated distance using a weighted combination of the cognitive distances across the relevant memories, the cognitive distances each weighted by a respective weight factor.

In Example 14, the subject matter of Example 13 optionally includes the microprocessor that may normalize the aggregated distance with respect to a combination of the weight factors.

In Example 15, the subject matter of any one or more of Examples 10-14 optionally include the microprocessor that may recognize the analogous case as one or more of the candidate cases having corresponding aggregated distances falling within a specified range or exceeding a specified threshold.

In Example 16, the subject matter of any one or more of Examples 10-15 optionally include the microprocessor that may recognize the analogous case based on a comparison of the aggregated distances for the plurality of candidate cases.

In Example 17, the subject matter of any one or more of Examples 10-16 optionally include the microprocessor that may sort at least some of the candidate cases according to a specified order of the aggregated distance; and wherein the output circuit may output the sorted candidate cases to a user or a process.

In Example 18, the subject matter of any one or more of Examples 10-17 optionally include the output circuit that further outputs to a user or a process one or more of: the aggregated distance of the recognized analogous case; the cognitive distances used for generating the aggregated distance; or the relevant memories associated with the cognitive distances.

In Example 19, the subject matter of Example 18 optionally includes the storage circuit that may update the attribute memories based on the query for the analogous case similar to the target case.

In Example 20, the subject matter of Example 19 optionally includes the update of the attribute memories includes adding a new attribute memory associated with a target attribute of the target case.

In Example 21, the subject matter of any one or more of Examples 19-20 optionally include the update of the attribute memories that may include adding to an existing attribute memory the target case or one or more second attributes selected from the target attributes.

In Example 22, the subject matter of any one or more of Examples 1-21 optionally include the candidate cases that may include a plurality of documents, the target case includes a target document, and the target attributes include a plurality of target terms within the target document. The microprocessor may query the knowledge base to recognize an analogous document similar to the target document using (1) the target terms and (2) a plurality of attribute memories each including first and second terms and an inter-attribute contextual representation of an interaction between the first and second terms in the context of the plurality of candidate documents.

Example 23 is a method for recognizing an analogous case from a knowledge base including a plurality of candidate cases. The method comprises: receiving a representation of a target case; extracting a plurality of target attributes from the representation of the target case; querying the knowledge base to recognize the analogous case similar to the target case in information content using (1) the target attributes and (2) a plurality of attribute memories each including first and second attributes and an inter-attribute contextual representation of interactions between the first and second attributes in a context of the plurality of candidate cases; and presenting the recognized analogous case to a user or a process.

In Example 24, the subject matter of Example 23 optionally includes the inter-attribute contextual representation that may include an indicator of co-existence of the first and second attributes in a candidate case.

In Example 25, the subject matter of Example 24 optionally includes the indicator of co-existence that may include a frequency of observations of co-existence of the first and second attributes in a candidate case.

In Example 26, the subject matter of any one or more of Examples 23-25 optionally include the attribute memories each of which is represented as a two-dimensional array indexed by the second attributes and the plurality of candidate cases.

In Example 27, the subject matter of Example 26 optionally includes the attribute memories each of which is represented as a two-dimensional array indexed by the second attributes and the plurality of candidate cases.

In Example 28, the subject matter of any one or more of Examples 23-27 optionally include querying the knowledge base that may include: identifying from the plurality of attribute memories a subset of relevant memories associated with the target attributes, the relevant memories each having a first attribute being one of the target attributes, and one or more second attributes selected from the target attributes different from the first attribute; and querying the relevant memories to recognize the analogous case.

In Example 29, the subject matter of Example 28 optionally includes the relevant memories each of which has the second attributes including an entirety of the target attributes different from the first attribute.

In Example 30, the subject matter of any one or more of Examples 28-29 optionally include querying the knowledge base that may include: for each of the relevant memory, computing a cognitive distance associated with a candidate case using the inter-attribute contextual representation in the context of the candidate case; and recognizing from the relevant memories the analogous case based on the cognitive distances respectively computed for the plurality of candidate cases across the relevant memories.

In Example 31, the subject matter of Example 30 optionally includes the cognitive distance including a Kolmogorov complexity measure.

In Example 32, the subject matter of any one or more of Examples 30-31 optionally include querying the knowledge base that may include generating, for a candidate case, an aggregated distance using the cognitive distances across the relevant memories, and recognizing the analogous case when the aggregated distances for the plurality of candidate cases satisfy a specified condition.

In Example 33, the subject matter of Example 32 optionally includes the aggregated distance that is generated using a linear or nonlinear combination of the cognitive distances across the relevant memories.

In Example 34, the subject matter of Example 33 optionally includes normalizing the aggregated distance with respect to a count of the plurality of the candidate cases.

In Example 35, the subject matter of any one or more of Examples 32-34 optionally include generating the aggregated distance using a weighted combination of the cognitive distances across the relevant memories, the cognitive distances each weighted by a respective weight factor.

In Example 36, the subject matter of Example 35 optionally includes normalizing the aggregated distance with respect to a combination of the weight factors.

In Example 37, the subject matter of any one or more of Examples 32-36 optionally include querying the knowledge base that may include recognizing the analogous case as one or more of the candidate cases having corresponding aggregated distances falling within a specified range or exceeding a specified threshold.

In Example 38, the subject matter of any one or more of Examples 32-37 optionally include querying the knowledge base that may include recognizing the analogous case based on a comparison of the aggregated distances for the plurality of candidate cases.

In Example 39, the subject matter of any one or more of Examples 32-38 optionally include sorting at least some of the candidate cases according to a specified order of the aggregated distance, and presenting the sorted candidate cases to a user or a process.

In Example 40, the subject matter of any one or more of Examples 32-39 optionally include presenting to a user or a process one or more of: the aggregated distance of the recognized analogous case; the cognitive distances used for generating the aggregated distance; or the relevant memories associated with the cognitive distances.

In Example 41, the subject matter of Example 40 optionally includes updating the attribute memories based on the query for the analogous case similar to the target case.

In Example 42, the subject matter of Example 41 optionally includes the update of the attribute memories that may include adding a new attribute memory associated with a target attribute of the target case.

In Example 43, the subject matter of any one or more of Examples 41-42 optionally include the update of the attribute memories that may include adding to an existing attribute memory the target case or one or more second attributes selected from the target attributes.

In Example 44, the subject matter of any one or more of Examples 23-43 optionally include the candidate cases, which include a plurality of documents. The target case includes a target document, and the target attributes include a plurality of target terms within the target document. The querying the knowledge base includes recognizing an analogous document similar to the target document using (1) the target terms and (2) a plurality of attribute memories each including first and second terms and an inter-attribute contextual representation of an interaction between the first and second terms in the context of the plurality of candidate documents.

Example 45 is a system comprising means for performing any of the methods of Examples 23 through 44.

Example 46 is a system for recognizing an analogous case from a knowledge base including a plurality of candidate cases. The system comprises: means for receiving a representation of a target case; means for extracting a plurality of target attributes from the representation of the target case; means for querying the knowledge base to recognize the analogous case similar to the target case in information content using (1) the target attributes and (2) a plurality of attribute memories each including first and second attributes and an inter-attribute contextual representation of interactions between the first and second attributes in a context of the plurality of candidate cases; and means for presenting the recognized analogous case to a user or a process.

In Example 47, the subject matter of Example 46 optionally includes the inter-attribute contextual representation that may include an indicator of co-existence of the first and second attributes in a candidate case.

In Example 48, the subject matter of Example 47 optionally includes the indicator of co-existence that may include a frequency of observations of co-existence of the first and second attributes in a candidate case.

In Example 49, the subject matter of any one or more of Examples 46-48 optionally include means for storing the plurality of attribute memories.

In Example 50, the subject matter of Example 49 optionally includes the attribute memories each of which is represented as a two-dimensional array indexed by the second attributes and the plurality of candidate cases.

In Example 51, the subject matter of any one or more of Examples 46-50 optionally include the means for querying the knowledge base that may include: means for identifying from the plurality of attribute memories a subset of relevant memories associated with the target attributes, the relevant memories each having a first attribute being one of the target attributes, and one or more second attributes selected from the target attributes different from the first attribute; and means for querying the relevant memories to recognize the analogous case.

In Example 52, the subject matter of Example 51 optionally includes the relevant memories each of which has the second attributes including an entirety of the target attributes different from the first attribute.

In Example 53, the subject matter of any one or more of Examples 51-52 optionally include the means for querying the knowledge base that may include: means for computing, for each of the relevant memory, a cognitive distance associated with a candidate case using the inter-attribute contextual representation in the context of the candidate case; and means for recognizing from the relevant memories the analogous case based on the cognitive distances respectively computed for the plurality of candidate cases across the relevant memories.

In Example 54, the subject matter of Example 53 optionally includes the cognitive distance that may include a Kolmogorov complexity measure.

In Example 55, the subject matter of any one or more of Examples 53-54 optionally include the means for querying the knowledge base that may include means for generating, for a candidate case, an aggregated distance using the cognitive distances across the relevant memories, and means for recognizing the analogous case when the aggregated distances for the plurality of candidate cases satisfy a specified condition.

In Example 56, the subject matter of Example 55 optionally includes the aggregated distance that is generated using a linear or nonlinear combination of the cognitive distances across the relevant memories.

In Example 57, the subject matter of Example 56 optionally includes means for normalizing the aggregated distance with respect to a count of the plurality of the candidate cases.

In Example 58, the subject matter of any one or more of Examples 55-57 optionally include the aggregated distance that is generated using a weighted combination of the cognitive distances across the relevant memories, the cognitive distances each weighted by a respective weight factor.

In Example 59, the subject matter of Example 58 optionally includes means for normalizing the aggregated distance with respect to a combination of the weight factors.

In Example 60, the subject matter of any one or more of Examples 55-59 optionally include the means for querying the knowledge base that may include means for recognizing the analogous case as one or more of the candidate cases having corresponding aggregated distances falling within a specified range or exceeding a specified threshold.

In Example 61, the subject matter of any one or more of Examples 55-60 optionally include the means for querying the knowledge base that may include means for recognizing the analogous case based on a comparison of the aggregated distances for the plurality of candidate cases.

In Example 62, the subject matter of any one or more of Examples 55-61 optionally include means for sorting at least some of the candidate cases according to a specified order of the aggregated distance, and means for presenting the sorted candidate cases to a user or a process.

In Example 63, the subject matter of any one or more of Examples 55-62 optionally include means for presenting to a user or a process one or more of: the aggregated distance of the recognized analogous case; the cognitive distances used for generating the aggregated distance; or the relevant memories associated with the cognitive distances.

In Example 64, the subject matter of Example 63 optionally includes means for updating the attribute memories based on the query for the analogous case similar to the target case.

In Example 65, the subject matter of Example 64 optionally includes the means for updating the attribute memories which include means for adding a new attribute memory associated with a target attribute of the target case.

In Example 66, the subject matter of any one or more of Examples 64-65 optionally include the means for updating the attribute memories that may include means for adding to an existing attribute memory the target case or one or more second attributes selected from the target attributes.

In Example 67, the subject matter of any one or more of Examples 46-66 optionally include the candidate cases that include a plurality of documents, the target case includes a target document, and the target attributes include a plurality of target terms within the target document; and wherein the means for querying the knowledge base includes means for recognizing an analogous document similar to the target document using (1) the target terms and (2) a plurality of attribute memories each including first and second terms and an inter-attribute contextual representation of an interaction between the first and second terms in the context of the plurality of candidate documents.

Example 68 is at least one machine-readable medium including instructions, which when executed by a machine, cause the machine to perform operations of any of the methods of Examples 14 through 26.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that may include elements in addition to those listed after such a term in a claim are still deemed to fall within the scope of that claim. Moreover, in the following claims, the terms "first," "second," and "third." etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for recognizing an analogous case from a knowledge base including a plurality of candidate cases, the system comprising:
   a data receiver to receive a representation of a target case;
   a plurality of attribute memories each including first and second attributes and an inter-attribute contextual representation of a frequency of observations of co-existence of the first and second attributes in a given candidate case of the plurality of candidate cases;
   a microprocessor coupled to the data receiver to generate a plurality of target attributes from the representation of the target case, and to query the knowledge base to recognize, from the plurality of candidate cases, an analogous case similar to the target case in information content using (1) the target attributes and (2) the plurality of attribute memories; and
   an output circuit to output the analogous case to a user or a process.

2. The system of claim 1, comprising a storage circuit coupled to the microprocessor, wherein the storage circuit is to store the plurality of attribute memories.

3. The system of claim 2, wherein the attribute memories each is represented in the storage circuit as a two-dimensional array indexed by the second attributes and the plurality of candidate cases.

4. The system of claim 1, wherein the microprocessor is to query the knowledge base, including:
   identify from the plurality of attribute memories a subset of relevant memories associated with the target attributes, the relevant memories each having a first attribute being one of the target attributes, and one or more second attributes selected from the target attributes different from the first attribute; and
   query the relevant memories to recognize the analogous case.

5. The system of claim 4, wherein the microprocessor is to recognize the analogous case, including:
   for each of the relevant memories, compute a cognitive distance associated with a candidate case using the inter-attribute contextual representation of the candidate case; and
   recognize from the relevant memories the analogous case based on the cognitive distances respectively computed for the plurality of candidate cases across the relevant memories.

6. The system of claim 5, wherein the cognitive distance includes a Kolmogorov complexity measure.

7. The system of claim 5, wherein the microprocessor is to perform ensemble voting including to generate, for a candidate case, an aggregated distance using the cognitive distances across the relevant memories,
   wherein the microprocessor is to recognize the analogous case when the aggregated distances for the plurality of candidate cases satisfy a specified condition.

8. The system of claim 7, wherein the microprocessor is to generate the aggregated distance using a linear or non-linear combination of the cognitive distances across the relevant memories.

9. The system of claim 7, wherein the microprocessor is to sort at least some of the candidate cases according to a specified order of the aggregated distance; and wherein the output circuit is to output the sorted candidate cases to a user or a process.

10. The system of claim 7, wherein the storage circuit is to update the attribute memories based on the query for the analogous case similar to the target case.

11. The system of claim 7, wherein the microprocessor is to recognize the analogous case based on a comparison of the aggregated distances for the plurality of candidate cases.

12. The system of claim 10, wherein the storage circuit is to update the attribute memories including:
   add a new attribute memory associated with a target attribute of the target case; or
   add the target case or one or more second attributes selected from the target attributes to at least one of the attribute memories.

13. A method for recognizing an analogous case from a knowledge base including a plurality of candidate cases, the method comprising:
   receiving a representation of a target case;
   extracting a plurality of target attributes from the representation of the target case;
   querying the knowledge base to recognize, from the plurality of candidate cases, an analogous case similar to the target case in information content using (1) the target attributes and (2) a plurality of attribute memories each including first and second attributes and an inter-attribute contextual representation of a frequency of observations of co-existence of the first and second attributes in a given candidate case of the plurality of candidate cases; and
   presenting the recognized analogous case to a user or a process.

14. The method of claim 13, wherein querying the knowledge base includes:
   identifying from the plurality of attribute memories a subset of relevant memories associated with the target attributes, the relevant memories each having a first attribute being one of the target attributes, and one or more second attributes selected from the target attributes different from the first attribute; and
   querying the relevant memories to recognize the analogous case.

15. The method of claim 14, wherein querying the knowledge base includes:
   for each of the relevant memory, computing a cognitive distance associated with a candidate case using the inter-attribute contextual representation of the candidate case; and
   recognizing from the relevant memories the analogous case based on the cognitive distances respectively computed for the plurality of candidate cases across the relevant memories.

16. At least one machine readable storage medium, comprising a plurality of instructions that, responsive to being executed with processor circuitry of a computing device, cause the computing device to:
   receive a representation of a target case;
   generate a plurality of target attributes from the representation of the target case;
   query a knowledge base including a plurality of candidate cases to recognize, from the plurality of candidate cases, the analogous case similar to the target case in information content using (1) the target attributes and (2) a plurality of attribute memories each including first and second attributes and an inter-attribute contextual representation of a frequency of observations of co-existence of the first and second attributes in a given candidate case of the plurality of candidate cases; and
   present the recognized analogous case to a user or a process.

17. The machine-readable storage medium of claim 16, wherein the operation that queries the knowledge base includes operations that:
   identify from the plurality of attribute memories a subset of relevant memories associated with the target attributes, the relevant memories each having a first attribute being one of the target attributes, and one or more second attributes selected from the target attributes different from the first attribute; and
   query the relevant memories to recognize the analogous case.

18. The machine-readable storage medium of claim 17, wherein the operation that queries the knowledge base includes operations that:
   for each of the relevant memory, compute a cognitive distance associated with a candidate case using the inter-attribute contextual representation of the candidate case; and
   recognize from the relevant memories the analogous case based on the cognitive distances respectively computed for the plurality of candidate cases across the relevant memories.

19. The machine-readable storage medium of claim 18, wherein the operation that queries the knowledge base further includes operations that:
   generate, for a candidate case, an aggregated distance using the cognitive distances across the relevant memories; and
   recognize the analogous case when the aggregated distances for the plurality of candidate cases satisfy a specified condition.

20. The machine-readable storage medium of claim 16, comprising instructions that, responsive to being executed by processor circuitry of a computing device, cause the computing device to update the attribute memories based on the query for the analogous case similar to the target case.

* * * * *